United States Patent
Wadzinski et al.

(10) Patent No.: US 10,039,229 B2
(45) Date of Patent: Aug. 7, 2018

(54) WALK POWER MOWER HAVING FORWARD AND REVERSE TRACTION DRIVE

(71) Applicant: The Toro Company, Bloomington, MN (US)

(72) Inventors: Chris A. Wadzinski, Inver Grove Heights, MN (US); Jackie R. Gust, Northfield, MN (US)

(73) Assignee: The Toro Company, Bloomington, MN (US)

( * ) Notice: Subject to any disclaimer, the term of this patent is extended or adjusted under 35 U.S.C. 154(b) by 16 days.

(21) Appl. No.: 15/195,648

(22) Filed: Jun. 28, 2016

(65) Prior Publication Data

US 2017/0367265 A1    Dec. 28, 2017

(51) Int. Cl.
| | | |
|---|---|---|
| *A01D 34/71* | (2006.01) | |
| *A01D 34/00* | (2006.01) | |
| *A01D 34/64* | (2006.01) | |
| *A01D 34/81* | (2006.01) | |
| *A01D 69/00* | (2006.01) | |
| *A01D 34/69* | (2006.01) | |
| *A01D 34/82* | (2006.01) | |
| *A01D 101/00* | (2006.01) | |

(52) U.S. Cl.
CPC ........... *A01D 34/71* (2013.01); *A01D 34/005* (2013.01); *A01D 34/64* (2013.01); *A01D 34/69* (2013.01); *A01D 34/81* (2013.01); *A01D 34/824* (2013.01); *A01D 69/00* (2013.01); *A01D 2101/00* (2013.01)

(58) Field of Classification Search
CPC ...... A01D 69/00; A01D 34/005; A01D 34/64; A01D 34/71; A01D 34/81; A01D 2101/00
USPC ...................... 180/19.1, 19.2, 19.3
See application file for complete search history.

(56) References Cited

U.S. PATENT DOCUMENTS

| | | | |
|---|---|---|---|
| 2,601,752 A | | 7/1952 | Rose |
| 2,937,706 A | * | 5/1960 | Chandler .................. B60K 1/00 180/14.6 |
| 5,375,674 A | * | 12/1994 | Peter ................... A01D 34/6806 180/19.3 |
| 6,082,803 A | | 7/2000 | Stalpes et al. |
| 9,055,713 B2 | | 6/2015 | Helgesen et al. |
| 9,677,648 B2 | * | 6/2017 | Wadzinski ............ F16H 7/0827 |
| 2002/0178708 A1 | * | 12/2002 | Williams ............... A01D 34/69 56/10.8 |
| 2002/0189137 A1 | | 12/2002 | Cox et al. |
| 2003/0182919 A1 | * | 10/2003 | Baumann ............... A01D 34/71 56/320.1 |

(Continued)

*Primary Examiner* — Joseph M Rocca
*Assistant Examiner* — Marlon A Arce
(74) *Attorney, Agent, or Firm* — James W. Miller (57) ABSTRACT

A walk power mower has a traction drive system that includes a front transmission powering a pair of front wheels and a rear transmission powering a pair of rear wheels. A first one of the transmissions provides forward motion of the mower when it is active and a second one of the transmissions provides rearward motion of the mower when it is active. A slidable handle grip on the handle having a cross bar long enough to be gripped by both hands of the user activates the first one of the transmission when it is slid downwardly on a handle out of a neutral position thereof. The slidable handle grip activates the second one of the transmissions when it is slid upwardly on the handle out of the neutral position.

8 Claims, 5 Drawing Sheets

(56) References Cited

U.S. PATENT DOCUMENTS

2007/0114076 A1\* 5/2007 Osborne .............. A01D 34/824
    180/19.3
2010/0025124 A1\* 2/2010 Arpino ................... B62B 3/001
    180/19.3

\* cited by examiner

WALK POWER MOWER HAVING FORWARD AND REVERSE TRACTION DRIVE

TECHNICAL FIELD

This invention relates to a walk power mower for cutting grass and, more particularly, to a traction drive system for self-propelling the mower.

BACKGROUND OF THE INVENTION

Self-propelled walk power mowers are well known for cutting grass. For example, such mowers are commonly used by property owners, such as homeowners, to cut their lawns. Such mowers have a cutting deck that houses a rotary grass cutting blade. The deck is supported by a plurality of wheels for rolling over the ground. A handle extends upwardly and rearwardly from the deck. A user who walks on the ground behind the deck grips a handle grip of the handle to manipulate and guide the mower during a grass mowing operation.

It can be difficult or is undesirable for some users to manually push a walk power mower over the ground in order to cut one's lawn. It is tiring to do so, particularly when the area being mowed is either large, hilly, or both. Thus, many mowers have traction drive systems that utilize part of the power generated by the prime mover carried on the mower to drive at least one pair of the mower's wheels, either the front wheels or the rear wheels, in a forward direction. Such a self-propelled mower relieves the user of the necessity of having to bodily push the mower over the ground. This greatly eases the physical effort required from the user in mowing one's lawn. The user now primarily guides or steers the mower during the powered forward motion provided by the traction drive system and the prime mover.

There are times when mowing one's lawn when the user needs to pull the mower in reverse at least over short distances. For example, when a user cuts grass under the branches of a bush, the user will ordinarily drive the mower forwardly so that the cutting blade reaches under the branches sufficiently to cut whatever patch of grass lies beneath the branches. However, once this patch of grass is cut, the user must pull back on the handle to pull the mower out from under the branches of the bush. While the traction drive system is designed with a one way clutch to allow the drive wheels to free-wheel during reverse motion so that the user is not pulling back against the resistance provided by the gearing in the traction drive system, the drive wheels of the mower are typically unpowered during this reverse motion.

As a result, many users end up having to manhandle or wrestle the mower back in this reverse motion scenario. This requires the user to expend physical energy and for some users accomplishing manual reverse motion of the mower may be difficult or impossible in some situations. This difficulty is exacerbated for those users in which trimming operations requiring reverse motions of the mower are numerous or are required on difficult terrain. For example, in trimming beneath a bush, pulling back on the mower is even more difficult if the user has to pull the mower back up a slope to get it out from under the branches of the bush. Accordingly, it would be an advance in the art to provide a reliable, durable, and cost effective traction drive system that provides powered motion of a walk power mower in both forward and reverse directions.

SUMMARY OF THE INVENTION

One aspect of this invention relates to a walk power mower which comprises a deck supported by a pair of front wheels and a pair of rear wheels. The deck has at least one grass cutting blade that rotates in a substantially horizontal plane about a substantially vertical axis to cut grass. The deck also has an upwardly and rearwardly extending handle that is gripped by a user who walks on the ground behind the deck to guide and manipulate the deck during motion of the deck over the ground. A prime mover is carried by the deck, the prime mover being operably coupled to the blade for effecting powered rotation of the blade. A variable speed traction drive system is carried on the deck, the prime mover being operably coupled to the traction drive system for effecting powered rotation of the front wheels and the rear wheels. The traction drive system comprises a rear transmission having a rear axle that is operatively connected to the rear wheels for powering the rear wheels to provide self-propelled motion of the deck in a first direction of motion over the ground, a front transmission having a front axle that is operatively connected to the front wheels for powering the front wheels to provide self-propelled motion of the deck in a second direction of motion over the ground that is opposite to the first direction of motion, and a control system carried on the handle that is selectively operable by a user for placing only one transmission at a time into operation so that the rear transmission is active to propel the deck in the first direction while the front transmission is inactive or the front transmission is active to propel the deck in the second direction while the rear transmission is inactive.

Another aspect of this invention relates to a walk power mower which comprises a traction drive system on a grass cutting deck having a pair of front wheels and a pair of rear wheels. A pair of transmissions power at least one pair of wheels on the deck. A first one of the transmissions provides forward motion of the mower when it is active and a second one of the transmissions provides rearward motion of the mower when it is active. A slidable handle grip is provided on a handle extending upwardly and rearwardly from the cutting deck. The handle grip has a cross bar long enough to be gripped by both hands of the user. The handle grip activates the first one of the transmissions when it is slid downwardly on a handle out of a neutral position thereof as a user walks forwardly holding the cross bar of the handle grip. The handle grip activates the second one of the transmissions when it is slid upwardly on the handle out of the neutral position as a user walks rearwardly holding the cross bar of the handle grip.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

Figure 1:
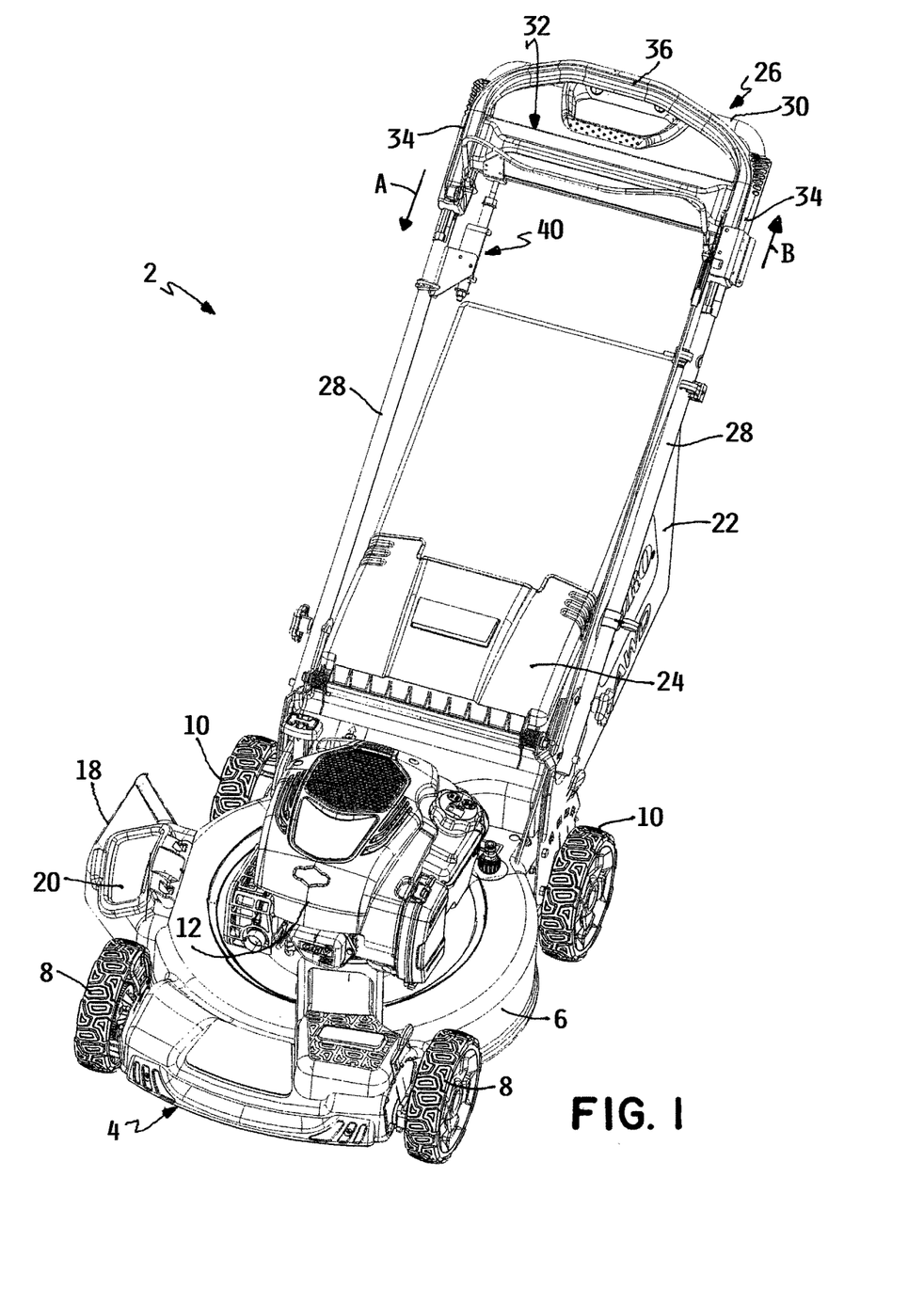
FIG. 1 is a perspective view of one embodiment of a walk power mower according to this invention.
Figure 3:
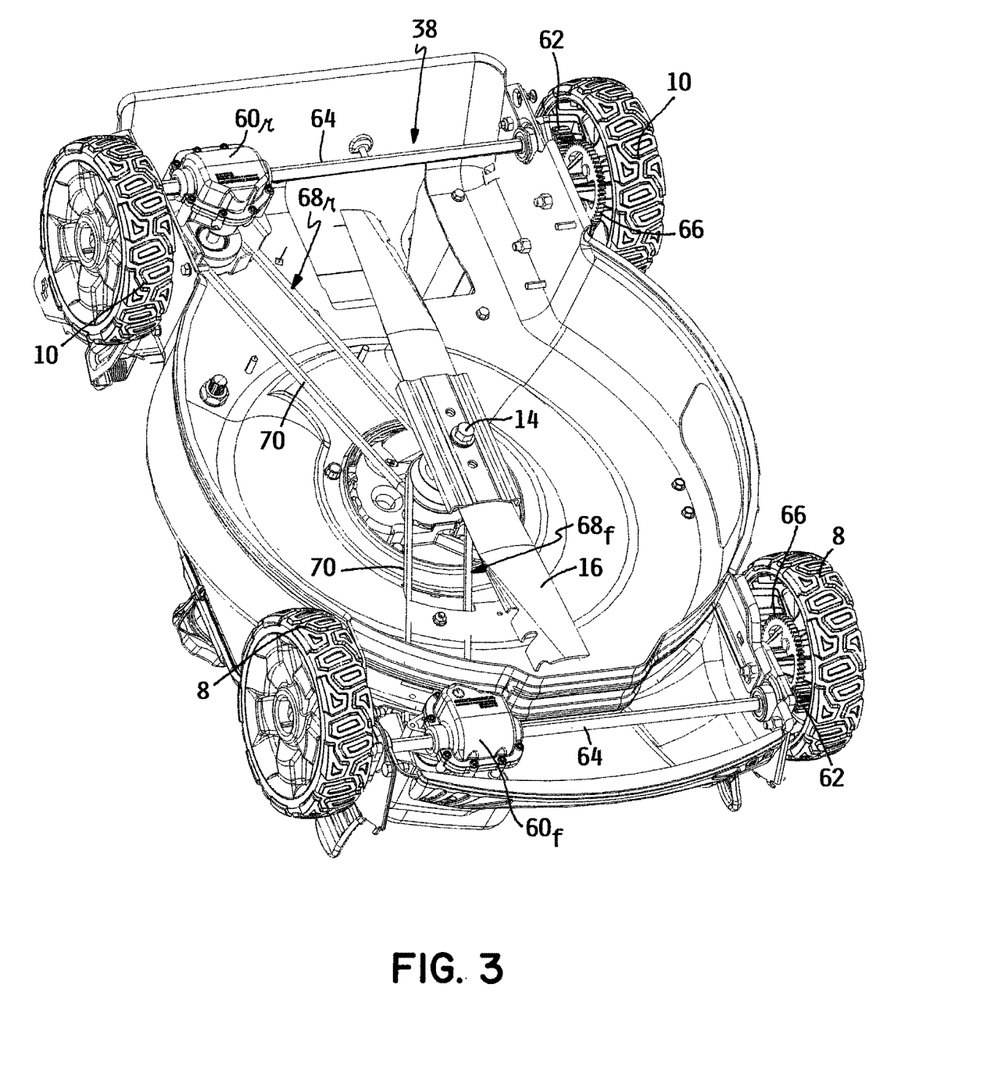
FIG. 3 is a perspective view of the underside of the cutting deck of the mower of FIG. 1, particularly illustrating the dual transmission traction drive system.

One embodiment of a walk power mower 2 according to this invention is illustrated in FIG. 1. Mower 2 comprises a cutting deck 4 that is formed with a generally toroidal cutting chamber 6 that faces downwardly and is open at its bottom. Deck 4 is supported for rolling over the ground by a pair of front wheels 8 and a pair of rear wheels 10. A prime mover 12, such as an internal combustion engine, is carried on top of deck 4. Referring now to FIG. 3, the drive shaft 14 of the prime mover extends vertically downwardly with its lower end extending into cutting chamber 6. A horizontal cutting blade 16 is positioned within cutting chamber 6 and is removably secured to the lower end of drive shaft 14 to rotate in a generally horizontal cutting plane to cut grass.

Referring again to FIG. 1, mower 2 is a three-in-one mower having side discharge, rear bagging and mulching modes of operation. In the side discharge mode, a side discharge chute 18 can be mated with a side discharge opening to discharge grass clippings to the side of mower 2 when a side discharge door 20 is opened. In the rear bagging mode, a grass clipping collection bag 22 is mated with a rear discharge opening to collect grass clippings being discharged to the rear of mower 2 when a rear discharge door 24 is opened. While FIG. 1 illustrates deck 4 as being both in the side discharge mode and the rear bagging mode, this is only for the purpose of illustration as these two modes would not be used simultaneously. When side discharge chute 18 is removed and side discharge door 20 is closed and when bag 22 is removed and rear discharge door 24 is closed, mower 2 is placed into its mulching mode in which grass clippings are driven downwardly out of cutting chamber 6 to discharge the clippings beneath mower 2. However, mower 2 need not have multiple modes of operation, but could be built as a single purpose side discharge, rear bagger, or mulching mower.

An upwardly and rearwardly extending handle 26 comprising a pair of laterally spaced handle tubes 28 joined by a top cross member 30. The lower ends of handle tubes 28 are attached to the rear of deck 4. Handle 26 includes a U-shaped handle grip 32 that has a pair of laterally spaced legs 34 connected together by an upper cross bar 36. Legs 34 of handle grip 32 are telescopically received on handle tubes 28 of handle 26 for sliding movement relative thereto. Thus, handle grip 32 is able to slide downwardly on handle tubes 28 as a user walks forwardly while gripping cross bar 36 of handle grip 32 with both of the user's hands.

Handle grip 32 slides downwardly by an amount that depends upon how fast the user walks forwardly. As will be described in more detail hereafter, the extent or amount of downward travel of handle grip 32 controls a traction drive system 38 of mower 2 to vary the forward ground speed of mower 2 to correspond to the user's walking pace. This type of speed controlling, slidable handle grip is used on the Personal Pace® line of walk power mowers manufactured and sold by The Toro Company, the assignee of this invention. In addition, this type of slidable handle grip is disclosed more fully in U.S. Pat. No. 6,082,083 to Stalpes, which patent is hereby incorporated by reference and shall be referred to as "Stalpes" hereafter.

In Stalpes, handle grip 32 is in a neutral, i.e., a drive disengaged position, when handle grip 32 is at the top of handle 26 with handle grip 32 located adjacent to cross member 30 that joins handle tubes 28 together. The only control motion of handle grip 32 in Stalpes is the downward sliding motion that engages the traction drive system of Stalpes in forward and that varies the forward ground speed in concert with the user's forward walking pace. When the user lets go of handle grip 32 in Stalpes, handle grip 32 is spring biased to slide back up handle 26 to return to the top thereof at which point the traction drive system becomes disengaged once again.

In mower 2 of this invention, the Stalpes handle grip 32 has been modified so that the neutral position of handle grip 32 is no longer at the top of the range of motion of handle grip 32. Now, the neutral position of handle grip 32 is displaced somewhat downwardly from cross member 30 of handle 26. A return to neutral system 40 maintains handle grip 32 in its now lower neutral position relative to cross member 30 of handle 26.

Handle grip 32 functions as it did in Stalpes when the user grips cross bar 36 of handle grip 32 and walks forwardly, i.e., handle grip 32 slides downwardly in the direction of the arrow A in FIG. 1 to activate traction drive system 38 in forward and to vary the forward ground speed in concert with the user's forward walking pace. Now, however, if the user grips cross bar 36 of handle grip 32 and walks rearwardly, as when pulling mower 2 back, handle grip 32 is now also able to slide upwardly out of neutral rather than being held in neutral as in Stalpes. This upward sliding motion of handle grip 32 is shown by the arrow B in FIG. 1. This activates traction drive system 38 in reverse and varies the reverse ground speed of mower 2 in concert with the user's rearward walking pace. In either forward or reverse powered motion of mower 2, when the user lets go of handle grip 32, return to neutral system 40 causes handle grip 32 to slide back to its centered neutral position between the lower and upper limits of the range of motion of handle grip 32 to disengage traction drive system 38.

Figure 2:
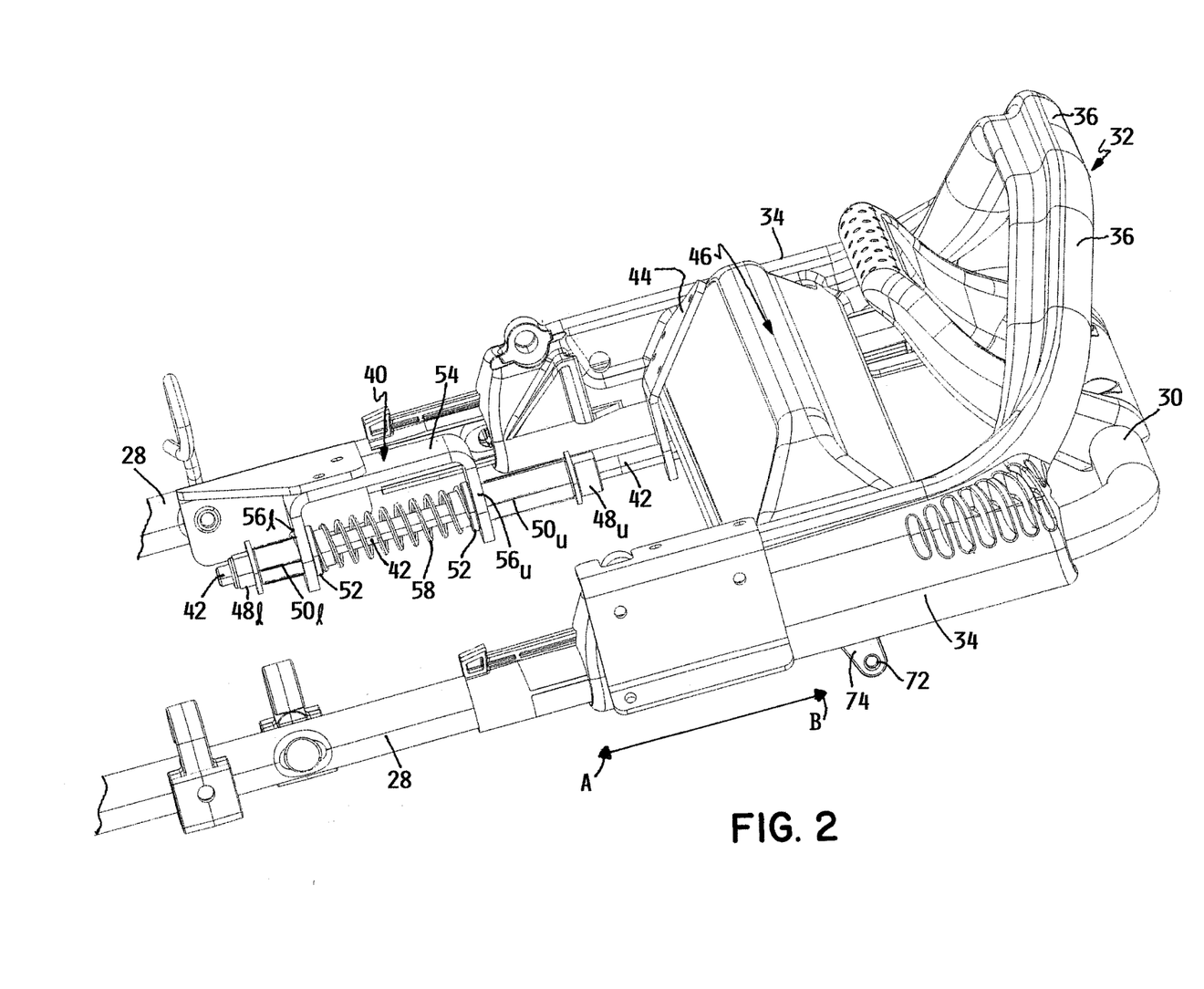
FIG. 2 is an enlarged perspective view of a portion of the handle of the mower of FIG. 1, particularly illustrating the return to neutral system that causes the slidable handle grip of the handle to return to a neutral position in which the traction drive system is disengaged once the user releases the handle grip.

Referring now to FIG. 2, return to neutral system 40 comprises a rod 42 having an upper end fixed by a bracket 44 to a laterally extending cross member 46 that is also part of handle grip 32. Rod 42 has spaced upper and lower push nuts $48_u$ and $48_l$ fixed thereto to move with rod 42. Push nuts 48 bear respectively against one end of cylindrical, upper and lower, push tubes $50_u$ and $50_l$ which are spaced along the length of rod 42 and through which rod 42 slides. Each push tube 50 has an annular thrust surface 52 that is formed as an integral part thereof. Push tubes 50 are assembled in an inverted relationship relative to each other along the length of rod 42 such that thrust surface 52 of upper push tube $50_u$ is at the lowermost end of upper push tube $50_u$ while thrust surface 52 of lower push tube $50_l$ is at the uppermost end of lower push tube $50_l$.

Return to neutral system 40 further includes a U-shaped clevis 54 fixed to handle 26 with the spaced, parallel side walls 56 of clevis 54 forming an upper wall $56_u$ and a lower wall $56_l$. Upper and lower push tubes $50_u$ and $50_l$ when assembled on rod 42 are arranged to pass through bores in upper and lower walls $56_u$ and $56_l$ of clevis 54 with thrust surfaces 52 on upper and lower push tubes $50_u$ and $50_l$ being inside clevis 54 immediately adjacent to upper and lower walls $56_u$ and $56_l$ of clevis 54. A compression spring 58 is arranged inside clevis 54 with the ends of spring 58 bearing against thrust surfaces 52 of upper and lower push tubes $50_u$ and $50_l$. When return to neutral system 40 is properly adjusted and traction drive system 38 is in neutral, spring 58 will force upper and lower push tubes apart $50_u$ and $50_l$ until thrust surfaces 52 thereon abut against the upper and lower walls $56_u$ and $56_l$ of clevis 54 and the opposite ends of upper and lower push tubes $50_u$ and $50_l$ are immediately adjacent to upper and lower push nuts $48_u$ and $48_l$.

When the user pushes down on handle grip 32 to initiate powered forward motion of mower 2, upper push nut $48_u$ on rod 42 presses down on the upper end of upper push tube $50_u$ to slide upper push tube $50_u$ downwardly relative to clevis 54. Note that lower push tube $50_l$ remains stationary with rod 42 simply sliding through lower push tube $50_l$ since the lower push nut $48_l$ moves away from the lowermost end of lower push tube $50_l$ and lower push tube $50_l$ remains within clevis 54 since thrust surface 52 on lower push tube $50_l$ is held in place by its engagement with lower wall $56_l$ of clevis 54. The downward motion of upper push tube $50_u$ compresses spring 58 downwardly. Thus, when the user eventually releases handle grip 32, the compressed spring 58 pushes back upwardly on upper push tube $50_u$ to cause the uppermost end of upper push tube $50_u$ to push the upper push nut $48_u$ back upwardly, thereby returning handle grip 32 to its centered neutral position.

Return to neutral system 40 works the same way but in an opposite fashion when handle grip 32 is pulled upwardly in the direction of the arrow B to initiate reverse powered motion of mower 2. This time it is lower push tube $50_l$ that is pushed upwardly by lower push nut $48_l$ with upper push tube $50_u$ remaining stationary. Thus, spring 58 is compressed upwardly. When handle grip 32 is eventually released, the lowermost end of lower push tube $50_l$ pushes downwardly on lower push nut $48_l$ as the upward compression of spring 58 is released to slide handle grip 32 back downwardly to return handle grip 32 to its centered neutral position.

Referring now to FIG. 3, traction drive system 38 comprises a first rear transmission $60_r$ which powers rear wheels 10 of mower 2 and a second front transmission $60_f$ which powers front wheels 8 of mower 2. Transmissions 60 preferably comprise, but are not limited to, mechanical gear drive transmissions that use various speed reduction stages to reduce the relatively high rotational speed of drive shaft 14 of prime mover 12 to a lower speed suitable for self-propelling mower 2 at ground speeds that match the walking pace of the user. Some of these speed reduction stages are built into the gearing inside the housings of transmissions 60. However, the final speed reduction stage is formed by a small diameter drive gear 62 on each end of an axle 64 of each transmission 60 that drives a larger diameter driven gear 66 fixedly attached to one of wheels 8, 10.

Drive gears 62 on the opposite ends of axle 64 of rear transmission $60_r$ engage the backsides of driven gears 66 of rear wheels 10. The reverse is true for drive gears 62 for front transmission $60_f$ which engage the front sides of driven gears 66 of front wheels 8. Thus, when axles 64 of transmissions 60 are rotated in opposite directions by the operation of prime mover 12, front and rear drive wheels 8 and 10 will be rotated in opposite directions relative to each other. For example, if rear drive wheels 10 are rotated in a forward direction to propel mower 2 forwardly, front drive wheels 8 will be rotated in a rearward direction to propel mower 2 in reverse. As a consequence, it should be apparent that only one transmission 60 is active at any given time while the other transmission 60 remains inactive. Either transmission 60 can be selected to be the one that provides forward motion while the remaining transmission 60 will then be the one that provides reverse motion.

Rear transmission 60 preferably has a split axle 64 and provides a differential action to permit rear wheels 10 to be driven at different speeds during a turn, such as when the user swings mower 2 around 180° at the end of a pass when mowing his or her lawn, to avoid tearing or scuffing the grass. Rear wheels 10 may rotate at different speeds during turns using either an unpowered or powered differential. For example, in an unpowered differential which is preferred due to somewhat lower cost, the portion of split axle 64 powering whichever rear wheel 10 is on the outside of the turn simply overruns the rotational speed of the portion of split axle 64 powering the rear wheel 10 on the inside of the turn to create the difference in wheel speed. Since front wheels 8 of mower 2 are typically lifted up off the ground during such a turnaround of mower 2, front transmission 60 preferably has a solid axle and lacks any differential action, thereby reducing overall cost of mower 2.

Each transmission 60 is provided with a one-way clutch that permits the wheels driven by that transmission 60 to free wheel when mower 2 is being propelled in a direction opposite to the direction transmission 60 is designed to operate. In the example where one transmission is active and is driving mower 2 forwardly while the other reverse drive transmission is inactive and is not in operation, the one way clutch in the inactive reverse drive transmission permits the drive wheels coupled to that transmission to rotate freely with respect to the internal gearing of the reverse drive transmission to avoid the drag or resistance such internal gearing would otherwise provide when mower 2 moves forwardly.

Each front and rear transmission $60_f$ and $60_r$ is separately driven by its own independent belt drive $68_f$ and $68_r$ from drive shaft 14 of prime mover 12. Each transmission 60 is a rocking transmission of the type disclosed in Stalpes. When handle grip 32 is in neutral and both transmissions 60 are inactive, belts 70 in belt drives 68 are sufficiently slack so that the input pulleys on transmissions 60 are stationary even though drive shaft 14 of prime mover 12 is rotating. Effectively, mower 2 is at rest even with the engine running when handle grip 32 is not being pushed or pulled by the user.

However, as the user slides handle grip 32 up or down on handle 26 in either the downward direction A or the upward direction B, this motion rocks one transmission 60 in a direction (rearwardly about its axle 64 for rear transmission $60_r$ and forwardly about its axle 64 for front transmission $60_f$) to tighten drive belt 70 to the rocking transmission while leaving drive belt 70 to other transmission slack. As drive belt 70 to the rocking transmission becomes taut, the transmission becomes active to begin rotating the pair of wheels powered by the rocking transmission. The speed of rotation of axle 64 of the rocking transmission, and thus the ground speed of mower 2, progressively increases as handle grip 32 is moved ever further in the selected direction and the tautness of belt 70 progressively increases. Thus, the ground speed of mower 2 progressively increases from zero to a maximum speed as handle grip 32 travels out of neutral to the end of its range of motion in the selected direction A or B. This enables the ground speed of mower 2 to be matched to the walking pace of the user whether mower 2 is being propelled in forward or reverse.

First and second Bowden cables (not shown) having inner wires carried within outer conduits operably couple handle grip 32 to transmissions 60. The first Bowden cable has a "live cable" setup in which a rear end of the outer conduit is fixed or clamped to handle 26 and the front end of the outer conduit is fixed or clamped to a lower end of one handle tube 28 or to a rear end of deck 4. The rear end of the inner wire of the first Bowden cable is secured to an opening 72 in a pivotal tab 74 (see FIG. 2) that is rotated rearwardly when handle grip 32 is moved downwardly in the direction of arrow A. The front end of the inner wire of the first Bowden cable is then attached to rear transmission $60_r$ to rock rear transmission $60_r$ rearwardly during downward motion of handle grip 32 in the direction of arrow A. In this "live cable" setup of the first Bowden cable, the downward motion of handle grip 32 causes the "live" inner wire of the first Bowden cable to slide rearwardly within the outer conduit in order to rock rear transmission $60_r$ rearwardly while the outer conduit remains fixed in place. The "live cable" setup of the first Bowden cable and its interaction with pivotal tab 74 is shown and described in more detail in the Stalpes patent which has previously been incorporated by reference herein.

The second Bowden cable has a "live conduit" setup in which the front end of the inner wire is fixed or clamped in place to deck 4 and the rear end of the inner wire is fixed or clamped in place to handle grip 32. The rear end of the conduit in the second Bowden cable is fixed or clamped in place to an upper portion of one handle tube 28 adjacent the place where the rear end of the inner wire of the second Bowden cable attaches to handle grip 32. The front end of the conduit in the second Bowden cable is clamped or fixed to front transmission 60 to rock front transmission 60 forwardly during upward motion of handle grip 32 in the direction of arrow B. In this "live conduit" setup, the upward motion of handle grip 32 in the direction of arrow B deforms the shape of the clamped inner wire of the second Bowden cable. This deformation in the shape of the inner wire causes the "live" conduit of the second Bowden cable to slide forwardly over the inner wire to push against front transmission $60_f$ to rock front transmission $60_f$ forwardly. Only one Bowden cable applies force to only one transmission at any given time with the other Bowden cable not applying force to the other transmission so that only one transmission at a time is activated.

Mower 2 equipped with traction drive system 38 of this invention has powered operation of rear transmission 60 to propel mower 2 forwardly in a variable speed manner as handle grip 32 is gripped by the user and the user walks forwardly, thereby sliding handle grip 32 downwardly on handle 26 in an amount proportional to the walking pace of the user. However, when trying to pull mower 2 back during a trimming operation or when trying to mow a small patch of grass in reverse, the user no longer has to use manual force to manhandle mower 2 in the reverse direction. Instead, the user merely maintains his or her grip on cross bar 36 of handle grip 32 and walks rearwardly at any desired pace. This will slide handle grip 32 upwardly on handle 26 to initiate powered operation of front transmission 60 to propel mower 2 rearwardly at a variable ground speed commensurate to the walking pace of the user. Thus, the task of operating mower 2 is greatly eased since mower 2 is self-propelled both in forward and reverse while maintaining the functionality of the Personal Pace® control system of The Toro Company that had previously been used only on mowers that were self-propelled in forward only.

The advantages of a mower that is self-propelled in both forward and reverse is achieved in a cost-effective manner by using mechanical, gear drive transmissions that are both durable and inexpensive in comparison to using hydraulic motor/pump combinations or electric motor/drive combinations. Moreover, since transmissions 60 used to drive front and rear wheels 8, 10 are different from one another and are mounted on separate front and rear axles, this allows rear transmission 60 to have a split axle/differential action configuration while front transmission 60 has a solid axle/non-differential action configuration. The manner of driving front and rear wheels 8, 10 using the same size drive gears 62 on the ends of the axles of the front and rear transmissions and the same size driven gears 66 on the wheels, but simply reversing which sides of driven gears 66 are engaged by drive gears 62, leads to increased part commonality and thus reduced cost. This allows a powered, reversible mower to be manufactured and sold at a reasonable cost.

Figure 4:
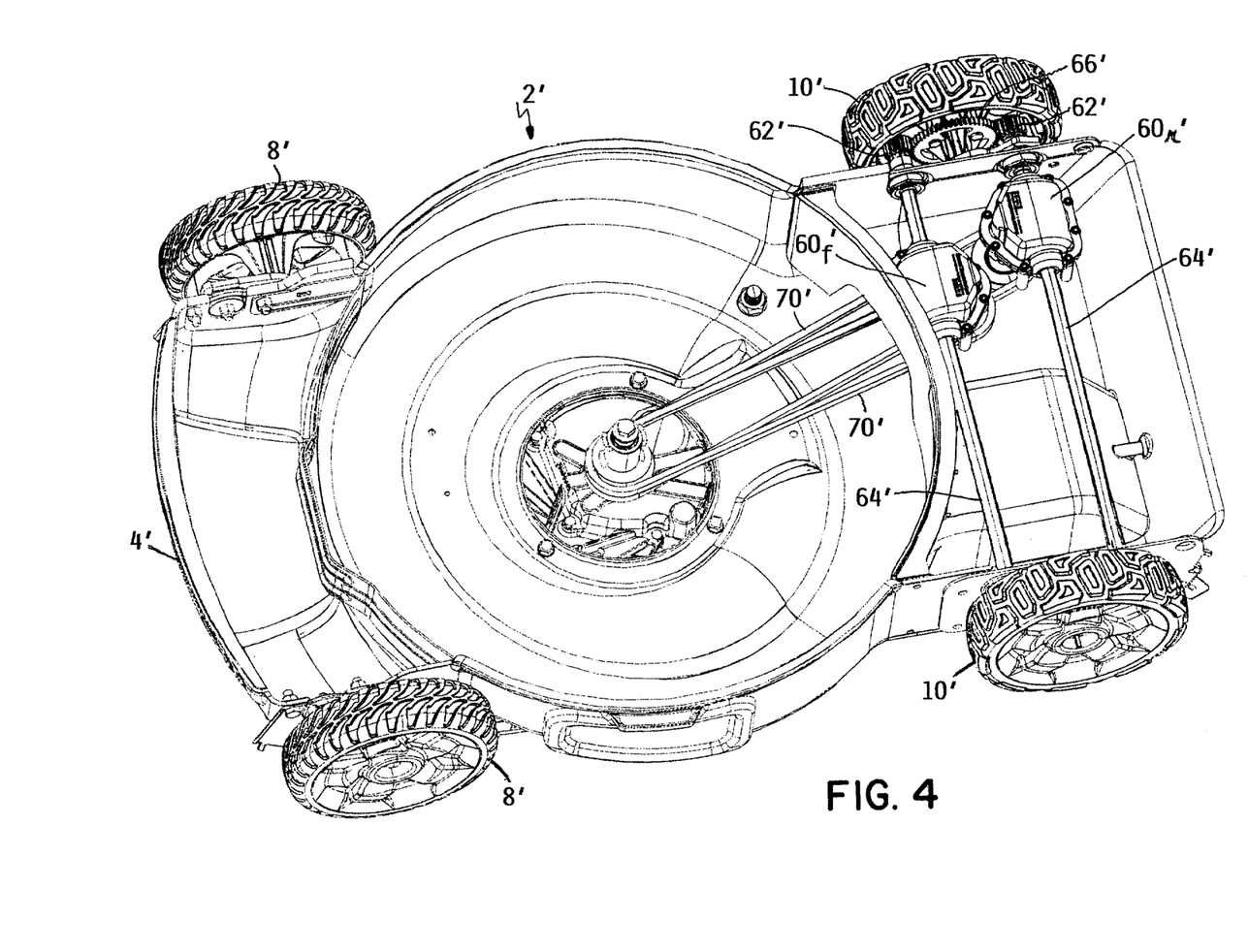
FIG. 4 is a perspective view of a portion of a second embodiment of a walk power mower according to this invention.
Figure 5:
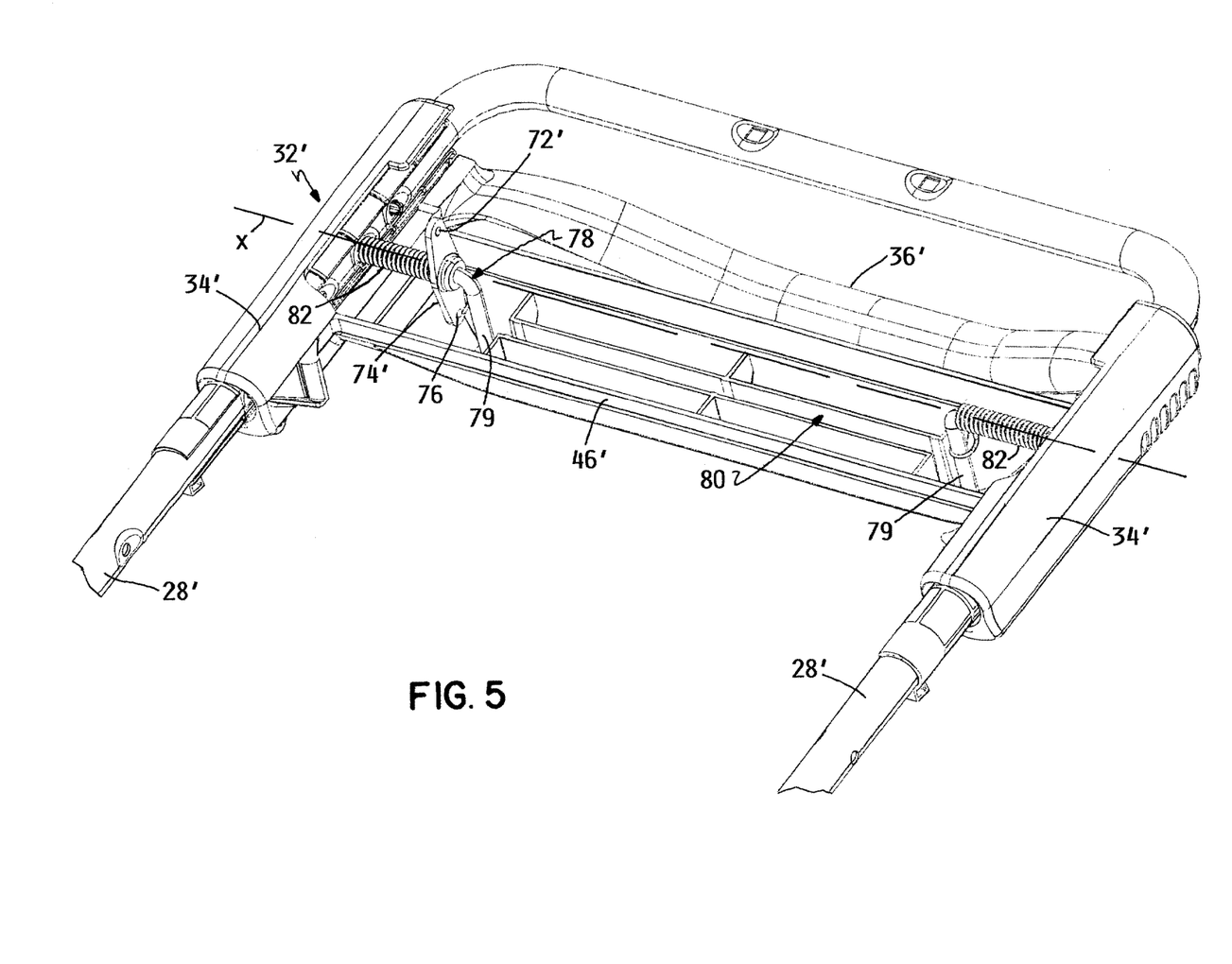
FIG. 5 is an enlarged perspective view of a portion of the handle of the mower of FIG. 4, particularly illustrating a second embodiment of the return to neutral system that causes the slidable handle grip of the handle to return to a neutral position in which the traction drive system is disengaged once the user releases the handle grip.

Referring now to FIGS. 4 and 5, a second embodiment of a mower according to this invention is illustrated generally as 2'. The same reference numerals used in FIGS. 1-3 to refer to components will be used in FIGS. 4 and 5 to refer to the same or corresponding components with a prime designation being used to refer to those components in the second embodiment, e.g. mower 2' in FIGS. 4 and 5 as opposed to mower 2 in FIGS. 1-3.

Referring now to FIG. 4, in mower 2' front transmission $60_f'$ and its axle 64 have been relocated from the front to the back of mower 2' so that only rear wheels 10' are reversibly driven by the dual transmissions $60_f'$ and $60_r'$ with such transmissions and their axles being disposed on opposite sides of the axis of rotation of rear wheels 10'. In this embodiment, front wheels 8' are present but unpowered with only rear wheels 10' serving to self-propel mower 2'. As in the first embodiment concerning mower 2, only one transmission 60' is active at any given time while the other transmission 60' remains inactive. Propelling rear wheels 10' in opposite directions may yield better traction than using front wheels 8' to drive mower 2' in the direction that is opposite to the direction that rear wheels 10' drive mower 2'. This is due to the fact that more of the weight of a mower like mower 2, 2' is over rear wheels 10' as compared to front wheels 8'. In addition, the filling of a grass clipping collection bag at the rear of mower 2' with grass clippings during a mowing operation only accentuates this rearward weight distribution.

In mower 2' as shown in FIG. 4, whichever transmission 60' is used to produce forward motion of mower 2' is preferably one having a split axle/differential feature as described earlier with respect to rear transmission $60_r$ in mower 2. The other transmission 60' that is used to produce reverse motion of mower 2' could also be one having a split axle/differential feature since both transmissions are now being used to power rear wheels 10'. However, since the times at which reverse motion is needed and the distances over which mower 2' would travel in reverse are much more limited than what is required for forward motion, whichever transmission 60' propels the mower in reverse could remain a transmission having a solid axle without any differential ability.

In addition to the use of both transmissions 60' to drive rear wheels 10', a simplified Bowden cable coupling setup is used in mower 2' as shown in FIG. 5. In mower 2', pivotal tab 74' now has a second opening 76 that is disposed on an opposite side of a horizontal axis of rotation, illustrated as x in FIG. 5, of a pivot rod 78 compared to the location of first opening 72' in tab 74'. As taught in more detail in Stalpes, tab 74' is rigidly attached to rod 78 to pivot by virtue of the pivoting motion of rod 78 caused by journaling the ends of rod 78 in the mower handle tubes 28' while a middle U-shaped portion 79 of rod 78 is captured within a channel 80 in cross member 46' of slidable handle grip 32'. Again, rod 78 and its interaction with cross member 46' are detailed more fully in the Stalpes patent which has been incorporated by reference herein.

When the user slides handle grip 32' downwardly on handle tubes 28', the portion of tab 74' having opening 72' is pivoted rearwardly as described in connection with the operation of mower 2. This pulls rearwardly on the "live cable" setup of the first Bowden cable that is connected to whichever transmission 60' is arranged to drive mower 2' forwardly to actuate the forward drive transmission 60'. Whichever transmission 60' is arranged to drive mower 2' in reverse is now connected by a "live cable" setup of the second Bowden cable to the newly added second opening 76 in tab 74'. Thus, when the user pulls handle grip 32' upwardly on handle tubes 28' as he or she walks in reverse, the portion of tab 74' having opening 76 is now pivoted rearwardly to actuate the reverse drive transmission 60'. Since both transmissions 60' are now at the rear of mower 2', the length of the second Bowden cable run is shortened compared to the length required in mower 2, and a "live cable" rather than a "live conduit" setup of the Bowden cable is used. This simplifies the routing and arrangement of the Bowden cables. However, the operation of mower 2' is the same as mower 2, namely pushing handle grip 32' downwardly as the user walks forwardly powers mower 2' in a forward direction at a speed commensurate to the user's walking pace while pulling handle grip 32' upwardly as the user walks rearwardly powers mower 2' in a rearward direction at a speed commensurate to the user's walking pace.

Referring still further to FIG. 5, the use of the double headed tab 74' as described above to activate both transmission $60_f'$ and $60_r'$ in mower 2' permits a simplified return to natural system 40'. All that is required now is the use of one or more torsion springs 82, preferably two such springs 82, surrounding the ends of rod 78 that lie along and define the rotational axis x of rod 78 with such springs being anchored at one end on rod 78 and at the other end on a portion of the adjacent handle tube 28'. When handle grip 32' is located in its centered, neutral, drive disengaging position, torsion springs 82 are in their unstressed state such that handle grip 32' is retained in neutral. As rod 78 is rotated about axis x in either one direction or the other due to motion of handle grip 32' relative to handle tubes 28', torsion springs 82 get coiled up or twisted in one direction or the other to resist the motion of handle grip 32' out of neutral. When the user subsequently releases handle grip 32', the biasing force built up in the coiled torsion springs 82 is now free to act on handle grip 32' to move it back to neutral.

The return to neutral system 40' as shown in FIG. 5 is simpler and thus less costly than system 40 shown in FIGS. 1-3 and takes up less space on mower 2'. Thus, the cable coupling setup and return to neutral system 40' shown in FIG. 5 could be used with mower 2 shown in FIGS. 1-3 if so desired.

Various modifications of this invention will be apparent to those skilled in the art. Thus, the scope of this invention is not to be limited to the details of the various embodiments described herein, but shall be limited only by the appended claims.

The invention claimed is:

1. A walk power mower, which comprises:
   (a) a deck supported by a pair of front wheels and a pair of rear wheels, the deck having at least one grass cutting blade that rotates in a substantially horizontal plane about a substantially vertical axis to cut grass, the deck having an upwardly and rearwardly extending handle that is gripped by a user who walks on the ground behind the deck to guide and manipulate the deck during motion of the deck over the ground;
   (b) a prime mover carried by the deck, the prime mover being operably coupled to the blade for effecting powered rotation of the blade; and
   (c) a variable speed traction drive system carried on the deck, the prime mover being operably coupled to the traction drive system for effecting powered rotation of the front wheels and the rear wheels, the traction drive system comprising:
      (i) a rear transmission having a rear axle that is operatively connected to the rear wheels for powering the rear wheels to provide self-propelled motion of the deck in a first direction of motion over the ground;
      (ii) a front transmission having a front axle that is operatively connected to the front wheels for powering the front wheels to provide self-propelled motion of the deck in a second direction of motion over the ground that is opposite to the first direction of motion; and
      (iii) a control system carried on the handle that is selectively operable by a user for placing only one transmission at a time into operation so that the rear transmission is active to propel the deck in the first direction while the front transmission is inactive or the front transmission is active to propel the deck in the second direction while the rear transmission is inactive.

2. The mower of claim 1, wherein the rear axle of the rear transmission is split into two parts with one axle part driving one rear wheel and the other axle part driving the other rear wheel, and wherein the rear transmission is configured to provide or permit, during powered operation of the rear transmission, differential speeds of the rear wheels during a turn of the mower with the rear wheel on the outside of the turn rotating faster than the rear wheel on the inside of the turn.

3. The mower of claim 2, wherein the front axle of the front transmission is a solid axle.

4. The mower of claim 3, wherein each transmission has a one-way clutch that permits the wheels driven by each transmission when each transmission is inactive to free wheel when the deck is being propelled in a direction opposite to the direction of motion that each transmission is designed to provide when active.

5. The mower of claim 1, wherein the first direction of motion is forward motion of the deck and the second direction of motion is reverse motion of the deck.

6. The mower of claim 1, wherein the control system comprises a slidable handle grip having a cross bar that is long enough to be gripped by both hands of the user, the slidable handle grip having a neutral position on the handle in which both the front and rear transmissions are inactive, the slidable handle grip being selectively slidable by the user out of the neutral position and downwardly on the handle as the user walks forwardly to put into operation one of the front and rear transmissions and the slidable handle grip being selectively slidable by the user out of the neutral position and upwardly on the handle as the user walks rearwardly to put into operation the other of the front and rear transmissions.

7. The mower of claim 6, wherein the one of the front and rear transmissions that is put into operation by the downward sliding motion of the handle grip is whichever transmission propels the mower forwardly and the other of the front and rear transmissions that is put into operation by the upward sliding motion of the handle grip is whichever transmission propels the mower rearwardly.

8. The mower of claim 1, wherein the front and rear axles have drive gears on each end thereof which engage driven gears on each of the front and rear wheels, the drive gears on the ends of the rear axle engaging against a first side of the driven gears on the rear wheels and the drive gears on the ends of front axle engaging against a second side of the driven gears on the front wheels which second side is opposite to the first side to produce opposite directions of rotation of the front and rear wheels even though the front and rear axles are rotated by the prime mover in a single identical direction of rotation.

\* \* \* \* \*